United States Patent [19]

DeLacy

[11] Patent Number: 4,734,868
[45] Date of Patent: Mar. 29, 1988

[54] PRECISION PAPER TRANSPORT SYSTEM

[75] Inventor: Thomas J. DeLacy, Santa Clara County, Calif.

[73] Assignee: VFN Technology Inc., Cupertino, Calif.

[21] Appl. No.: 887,660

[22] Filed: Jul. 21, 1986

[51] Int. Cl.$^4$ ............................................. G05B 11/01
[52] U.S. Cl. .................. 364/519; 355/14 R; 364/518
[58] Field of Search ...................... 364/518, 519, 521; 355/4, 14 R, 77; 101/151, 152, 248

[56] References Cited

U.S. PATENT DOCUMENTS

| | | | |
|---|---|---|---|
| 3,919,560 | 11/1975 | Nopper | 250/557 |
| 4,091,911 | 5/1978 | Chang et al. | 364/519 X |
| 4,485,982 | 12/1984 | St. John et al. | 242/57.1 |
| 4,569,584 | 2/1986 | St. John et al. | 355/14 R |
| 4,591,969 | 5/1986 | Bloom et al. | 364/519 X |

*Primary Examiner*—Gary V. Harkcom
*Assistant Examiner*—H. R. Herndon
*Attorney, Agent, or Firm*—Flehr, Hohbach, Test, Albritton, and Herbert

[57] ABSTRACT

A novel closed loop direct position feedback control method and recording apparatus for producing on a recording medium a plurality of successive print lines or otherwise component images. An appendant demarcation device provide for the proper abutting and spacing of each independent print character to prevent or minimize any perceived "banding" in the printed image. The apparatus includes a device for transporting the medium along a path orthogonal to the print head, a recording station in the path and having a translating head for inking, pring, or otherwise suitable device, for producing single lines or swaths of print in conjunction with the indexed advance of the medium relative to the print head. The transport device is operative to advance a first print line or swath through the recording station to form a first print line, to identify and store the position coordinates of each print line or swath, and to advance the recording medium for successive line or swath printing. The direct position feedback control apparatus also includes demarcation sensing and printing device for relative positioning, whereby the distance between the location of any sensed or printed demarcation reference and the next successive print line is controlled such that each print line will neglect the positioning error in any previous print line or swath.

25 Claims, 11 Drawing Figures

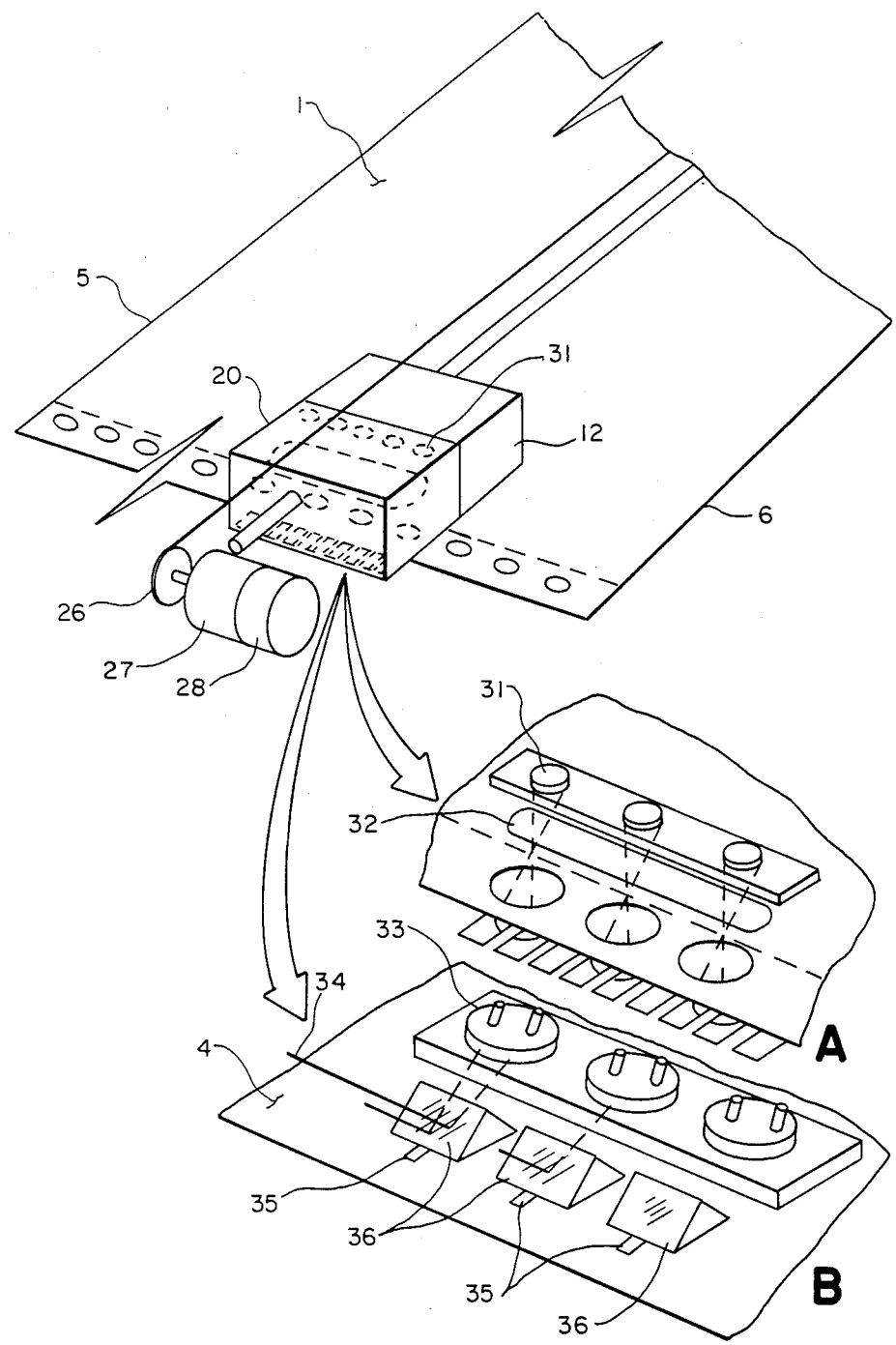
FIG.—4

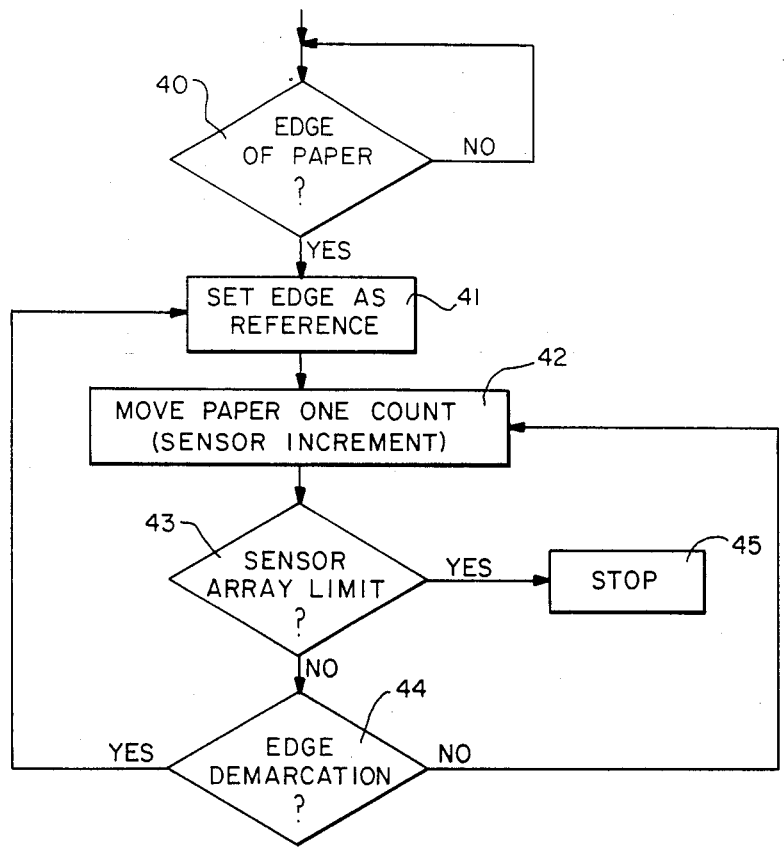
FIG. —5
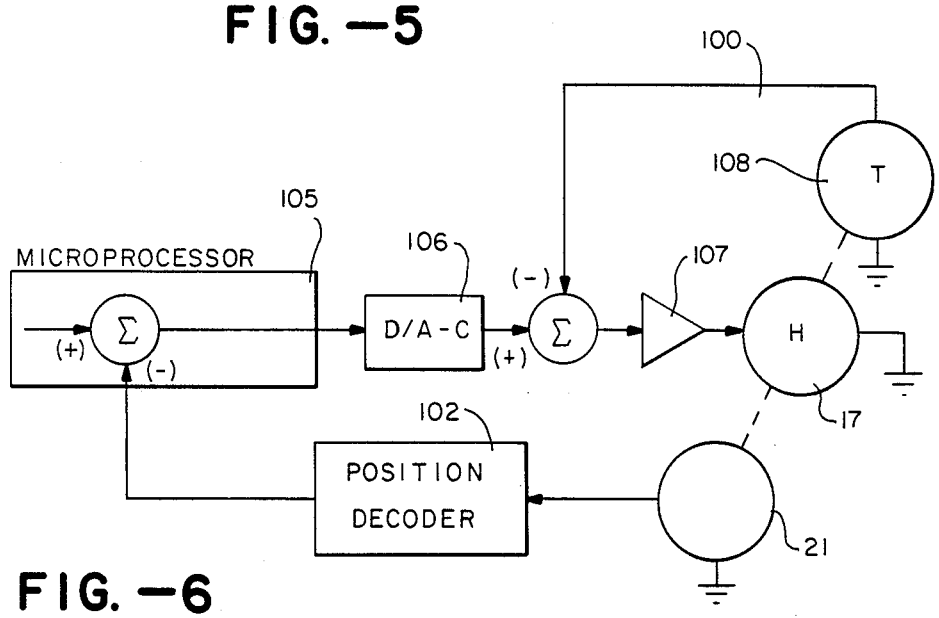
FIG. —6

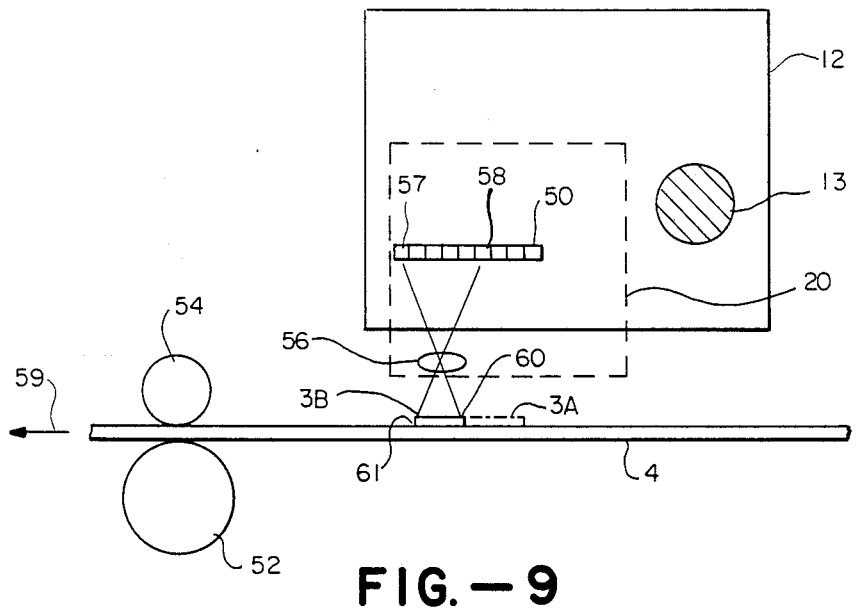
FIG.—9
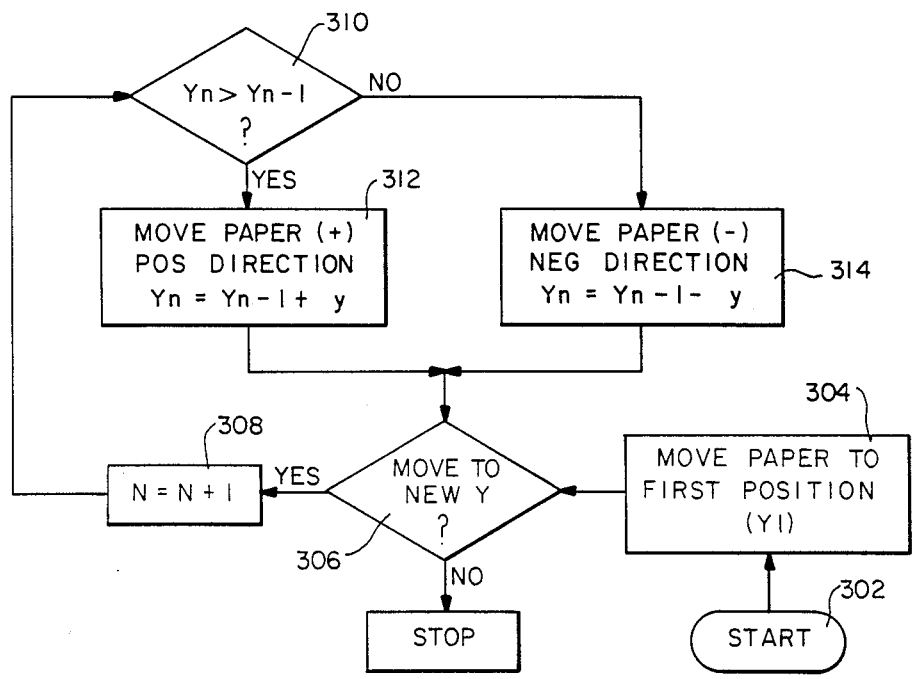
FIG.—8

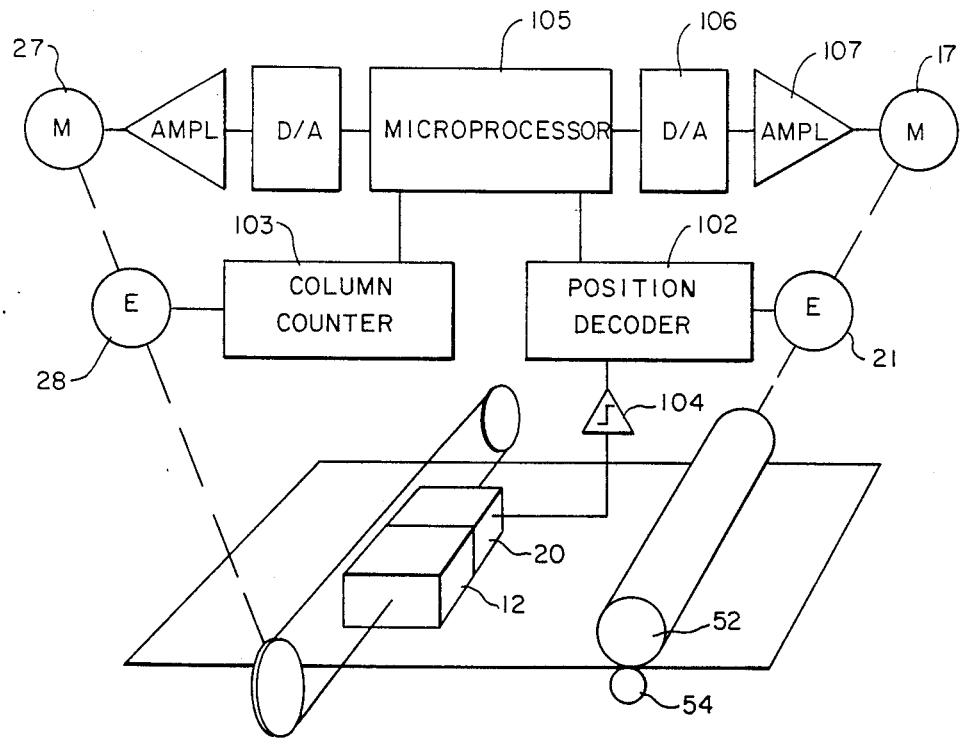
FIG.—10
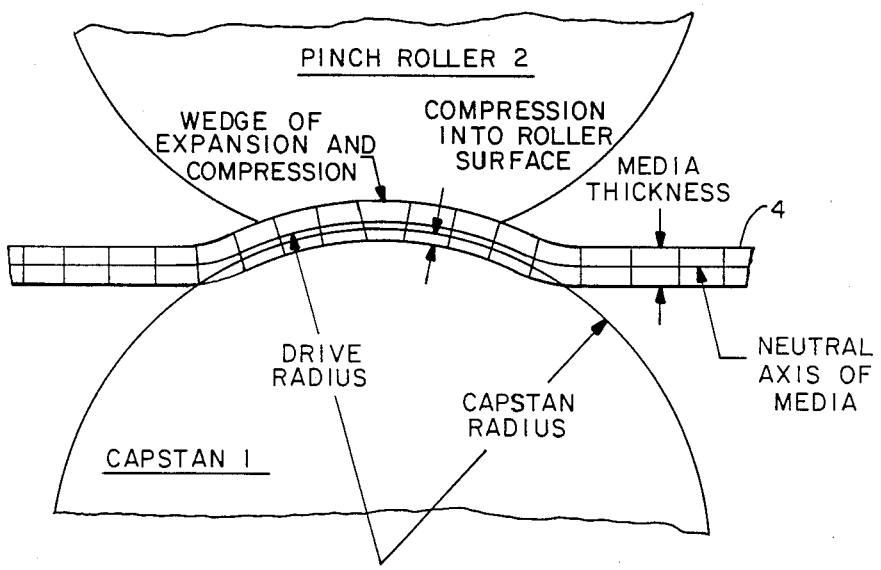
FIG.—11

PRECISION PAPER TRANSPORT SYSTEM

BACKGROUND OF THE INVENTION

1. Field of the Invention

This invention relates generally to paper transport systems and more particularly to a transport system relying on demarcations sensed on the paper to accurately position the paper relative to a print head. The term, "paper" as used throughout this specification denotes any suitable recording medium for printing text or graphics, regardless of substance or size.

2. Description of the Prior Art

Line printers and plotters are widely used to produce computer-based hard copy output as a result of their relative simplicity and low cost. In the prior art, these print mechanisms have been characterized by the controlled movement of the to-be-printed medium in a machine direction past a stationary or translating print head or pen which is caused to print on the paper in the transverse direction. Depending on the nature and construction of the inking system, including the intended printing sequence, the paper may be controlled to move continuously, incrementally or bidirectionally in the machine direction with respect to the print head or pen.

Conventional paper transports for printer mechanisms may be generally divided into friction and tractor drives. Friction drives pinch the paper between a driving drum or roller and a pinch roller(s), and are used primarily for advancing single cut sheets of paper through the printer. In contrast, tractor drives are designed to advance continuous lengths of paper via a sprocket which engages a series of holes located at even increments along one or both edge-margins of the paper, i.e. beyond (outside) the print area. In the latter case the length of the paper is usually perforated to permit removal of the outer sprocket holes and for separation of the individual sheets of paper following printing.

In the prior art, tractor drives have been used primarily for printing text in conjunction with a unidirectional paper transport system which typically exhibits relatively low registration accuracy. Cumulative coupling error is attributable to built-in clearances between the sprocket teeth and holes, error due to mismatch between sprocket hole centers, and shifting due to hole enlargements or deformation resulting from sprocket engagement. Typically the maximum positioning accuracy of a sprocket drive transport is in the order of several thousandths of an inch.

Equivalent paper coupling errors are avoided in friction drives due to the direct surface coupling of the capstan with the paper. Prior art friction paper transports have exhibited paper position accuracy as small as 1/1000 of an inch. Coupling errors in friction drives arise from manufacturing tolerances on the friction wheel radius and the trueness (roundness) and tolerances of reducing elements between the friction wheel and the controlling motor, as well as rubber compression and varying media coupling onto the roughened surface.

The coupling error and limitations of the prior art are overcome by the subject invention through the use of a novel position feedback mechanism. Micrometer positioning accuracy is offered in embodiments for both tractor and friction drive transports. The invention may be used to virtually eliminate mechanical registration error contributing to fringe banding, whereby higher speed precision electronic printing is made possible for high-resolution, linear reproduction (copy) response for both black-and-white and color dot matrix hard copy output.

Various solutions to achieving precision registration of a printer paper about a print head have been pursued by the graphics industry, the most relevant of which is represented by the Versatec Model—four color printer, manufactured by Versatec Corporation of Santa Clara, CA. The system employs pre-printed margin demarcations having an interdependent spatial relationship, wherein appendent sensor means is used to detect each of said demarcations in order to compensate for positioning error due to paper shrinkage. A positioning signal responding to the measured distance between said demarcations is used to activate a repeated multipass paper advance after the paper is initially conditioned through a first pass. A major disadvantage of the Versatec printer that is overcome by this invention is that the Versatec system advances the paper based on the absolute distance between pre-printed demarcations as opposed to relative positioning of the print head as taught herein. Accordingly, the Versatec system, while superb for a continuous motion advance in conjunction with a suitable capstan drive, is not nearly as effective with paper requiring single-line indexing or swath printing. For example, in the case of a tractor feed drive, as changes in the spacing between the holes in the paper due to elongation or tears, affecting paper registration, may result in perceived "banding" due to cumulative positioning error that cannot be adequately reduced or compensated by averaging techniques to allow for changes in the distance between the pre-printed demarcations used to measure paper shrinkage. In contrast to the limitations of the Versatec printer, the relative positioning taught herein compensates for both coupling error and paper shrinkage. In addition to inherent limitations of coupling error, the Versatec system prints colors serially, i.e., one line at a time whereas this system provides for multiple line printing with a single swath or pass. Accordingly, colors or lines of print are registered with each other via the print head. Thus, "fringe banding" a visual phenomenon inherent in the teachings of the prior art is overcome by this invention.

Such fringe banding is especially a problem at borders and edges or in multi-color printing. Such errors can come from a multitude of sources including changes in the effective radius of the drive wheels; errors caused by the drive reduction mechanism; windup tolerances in the motor shaft and drive belts; and deadband errors which may occur in the encoder, or due to friction.

FIG. 11 illustrates the potential sources of positioning error in a drive system wherein a capstan 1 and pinch roller 2 advance the paper on which printing is carried out. It should be noted that the drive radius varies with the thickness of the media, since it is measured from the centerline of the capstan 1 to the centerline 3 of the print media 4.

The following example data represent the degree and source of cumulative coupling error that is responsible for the perceived "banding" which limits the resolution of conventional printers. These data are based on a typical 0.50" dia direct 0.382" capstan drive advancing 0.125" per step, and lead to the cumulative error calculated below. These data assume a nominal paper thickness within the tolerances indicated. A major source of coupling error (not included in the table) is the variation in the selected paper thickness which represents addition to effective coupling error not compensated or addressed in prior art printers.

Within the thickness range of typical commercial papers, e.g. 2 to 8 mils, the potential contribution to the effective coupling error is a factor of two times the cumulative error from all other mechanical sources. The required positioning accuracy (in the order of several micrometers) to eliminate the nuisance of fringe banding is not possible or advanced in the teachings of the prior art for precision printers or plotters.

| Source of Error | COUPLING ERROR Tolerance (+/− inch) | Contribution to total step error (+/−um) |
|---|---|---|
| Capstan: | | |
| Radius | 0.0001 | 1.27 |
| Out of round | 0.00005 | 0.64 |
| Riding Radius (Paper): | | |
| Engagement | 0.001 | 12.70 |
| Paper Thickness | 0.0005 | 3.18 |
| Reduction Coupling: | | |
| Coupling (gear noise) | N/A | 0 |
| Coupling ratio tolerance | N/A | 0 |
| Deadband: | | |
| Encoder resolution | 4000 pulses/rev | 5.00 |
| Frictional | — | 2.00 |
| Backlash | None | 0 |
| Windup | — | 1.00 |

Representative Total Error:
+/− 26 um
(+1−.001″)

Systems incorporating coarse and fine positioning according to existing demarcations on film strips (i.e. the sprocket holes) have been disclosed by Field, et al.—see Patentschrift DE 27 22 378 and Brevet d'Invention No. 77 13050.

However, while offering means for precision frame registration for high resolution cameras and projectors, the perceived cumulative error in extending the line width of the recording medium from a narrow film strip to an 80-column paper and assumed coupling error makes the transfer of technology difficult and not obvious. For example, misregistration of successive line print creates fringe banding or density variation due to inking which is not perceived or addressed in the registration of picture frames for projection or camera copy. Also in the case of film, the problem of frame by frame registration is directed at the successive overlay of a moving image and frame to create the illusion of steadiness, whereas in the case of printing the problem of registration is directed at repeating the registration within a constant frame image. Accordingly, precision paper registration transport employing the features of relevant prior art in apparatus developed for the motion picture industry has not been adopted or heretofore advanced for application to a precision paper drive system for printers or plotters.

SUMMARY OF THE INVENTION

It is therefore an object of this invention to provide an improved paper transport and positioning system.

Another objective of this invention is to provide a paper transport system capable of very accurate paper positioning relative to a print head capable of printing lines orthogonal to a direction of paper advance.

Another objective is to provide a paper transport system utilizing positioning feedback signals to provide very accurate relative alignment of print to appear on the surface of a paper.

Another objective is to provide a low cost precision registration and transport system which is adaptable to a conventional sprocket wheel advance.

Yet another objective is to provide a paper transport system having means for positioning feedback relative to known demarcation points, and including means for printing or imposing demarcations where none would ordinarily be found.

Methods and apparatus are disclosed for the precision transport advance of recording media such as paper in a printer, plotter, or precision inking or imaging device. In the following summary and detailed disclosure of these teachings, all to-be-printed material with reference to media for printing will be referred to simply as paper.

The apparatus according to this invention is used for precise paper registration and advance in association with a print head, scan head or pen in a printing and/or scanning device. It is comprised of a motor driven sprocket or capstan for engaging and driving the paper, a sensor means for determining the position of the paper through edge or mark detection, and a control circuit utilizing the paper position feedback from the sensor to actively control the movement of the paper with respect to the print head, scan head or pen.

More particularly, the system herein comprises a print head positioned over the surface of the paper to print lines orthogonal to its direction of movement, and a sensor carried on the carriage with said print head for sensing demarcations that function as position references on the paper. As the paper is advanced to position the paper relative to the print head, the sensor senses the location of the edge of the demarcation and provides a positioning feedback signal to the drive means for accurately positioning the print head relative to the demarcation, whereby very accurate positioning of the paper relative to the print head is achieved, regardless of the inherent accuracy of the mechanical drive used to position the paper. The demarcation sensor may include means for forcing a demarcation, where none ordinarily exists on the paper. In this application forcing of a demarcation is in reference to a capstan or friction drive, whereas in the case of a sprocket drive paper a sprocket hole or the like may normally function as a demarcation. In particular, in the case of all letter quality paper, no such demarcation(s) typically exists. Therefore, either a visible demarcation on a removable fringe of the paper may be printed, or an otherwise (e.g., invisible or reflecting) demarcation may be printed, of a quality detectable by the sensor which is to seek the demarcation. Alternatively, the lines of characters themselves may function as the demarcations since relative positioning of lines of characters or other print outputs is a key objective of the invention.

BRIEF DESCRIPTION OF THE DRAWINGS

FIG. 4 illustrates an array of sensors for sensing demarcations in accordance with the teachings herein.

FIG. 5 is a flow chart of a sequence by which edges and demarcations may be sensed to carry out the relative positioning function of this invention.

FIG. 8 is a flow chart of the steps involved in bidirectional positioning of the paper.

FIG. 9 is a side elevational view of the basic elements of a preferred embodiment of a feedback position control paper transport system incorporating demarcation sensing in accordance with this invention.

FIG. 10 is a block diagram of electronics useful in implementing the feedback control positioning system of this invention.

FIG. 11 illustrates sources of error in prior art positioning systems.

DESCRIPTION OF PREFERRED EMBODIMENTS

Figure 1:
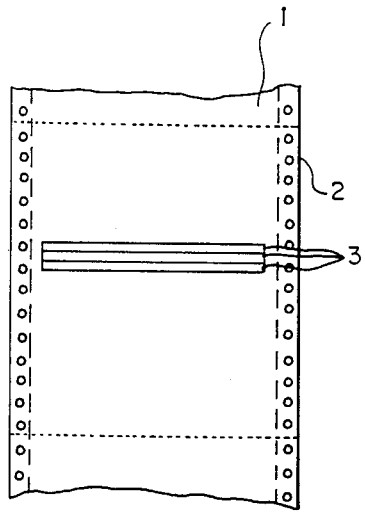
FIGS. 1 and 2 illustrate the most common types of paper forms to be used in conjunction with this invention.
Figure 2:
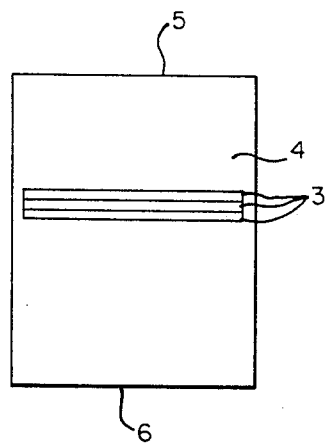

The preferred embodiment of this invention is dependent on the specific application, e.g., the required speed and nature of mixed text and graphics (half-tones, duatones, 4-color print format, etc.). FIGS. 1 and 2 illustrate the most common paper forms (tractor feed and sheet stock) which may be used in conjunction with the invention. Tractor feed paper 1 is typically supplied in roll form, or perforated and folded lengths known as Z-fold or fan-fold paper. Tractor feed paper is characterized by a continuous line of equally spaced sprocket holes 2 which run the entire length of the paper along one or most often both edges of the paper. The holes are sequentially engaged by the sprocket or sprockets in the printer drive mechanism which advances the paper in coordination with the movement of the print head or pen. The print head (except in the case of plotters) is typically caused to ink the paper along a line or bounded series of lines (print band swath) orthogonal to the machine direction or feed. It is common, but not necessary that the print bands 3 have a width equal to an integer subdivision of the sprocket hole centerline spacing; each line or character is printed in fixed spatial relationship to the sprocket holes.

Referring to FIG. 2, sheet stock 4 does not have sprocket holes and must be transported through the printer with a friction drive. As with tractor feed paper, printed lines or band swaths are positioned by the print head along a direction which is orthogonal to the machine direction of the printer. It is common, particularly in printers that feature automatic sheet feed, for the printed band swaths to be positioned on the paper to achieve a fixed spatial relationship with respect to the location of the leading 5 or trailing 6 edge of the paper.

Figure 3:
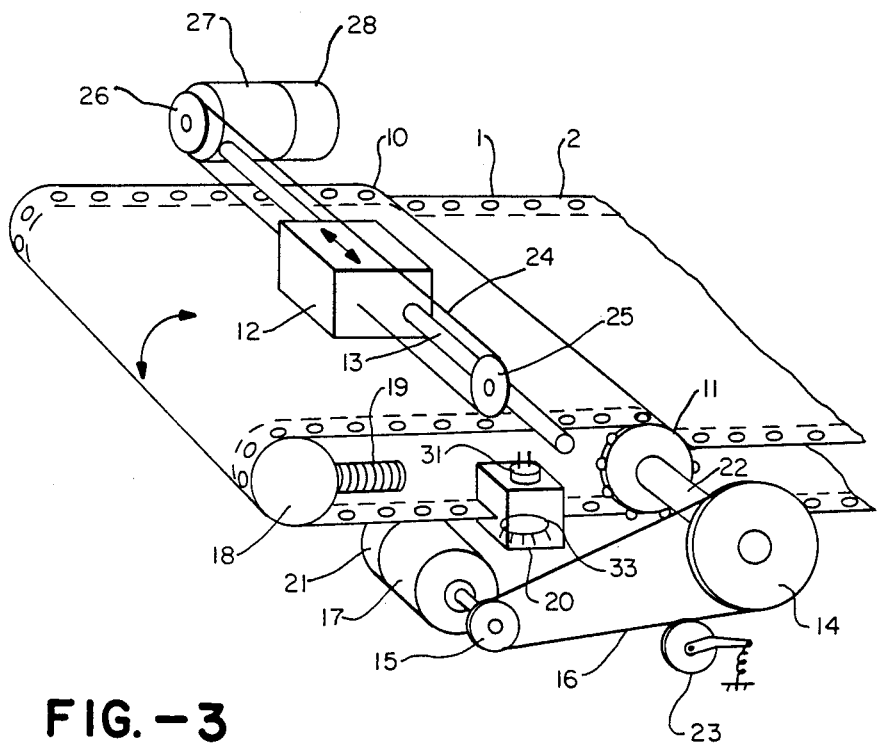
FIG. 3 is a diagrammatic view of a tractor feed paper transport printer system embodying this invention.

An embodiment of a tractor feed paper transport printer according to the teachings of this invention is shown in FIG. 3. Tractor feed paper 1 is driven from two sides by the action of a coaxial pair of sprocket wheels 10, 11 therein forming a paper loop around cylindrical rod 19 which draws the paper taut about the sprocket wheels through the action of a spring or springs 19. Spring loaded rod 18 removes the backlash between sprocket wheels 10, 11 and sprocket holes 2 to provide bidirectional control for the paper drive. Sprockets 10 and 11 are spaced apart and oriented along a common axle 22 to properly engage the sprocket holes 2 located along the running edges of the paper 1. The paper 1 is held about each sprocket by guides, not shown, which serve to assure that the paper engages and rides properly on the sprocket wheels 10, 11.

Sprocket axle 22 is preferably driven through a reduction pulley or gear train from motor 17. The reduction coupling reduces the torque requirement and facilitates greater positional resolution of the motor over a direct drive design. Usually only a small reduction (5:1) is commercially practical for high speed printers as the ultimate speed of the paper transport is linearly compromised by the reduction. In FIG. 3, the reduction drive is shown as a pair of pulleys 14, 15 attached to sprocket axle 22 and drive motor 17, respectively. A drive belt 16 is engaged therebetween and tensioned by a side loading idler pulley 23 to remove backlash from the coupling.

A suitable motor 17 may be selected from either incremental stepper motors or conventional dc motors for indexing or continuous resolution advance, respectively. Selection of the specific motor drive will be influenced by the required speed and resolution of the transport device and dependent system cost. For example, stepper motors offer incremental movement in discrete angular steps. Although comparatively simple and less expensive to control relative to alternative dc motors and drives, they are inherently slower and provide lower angular resolution for spatial separation due to their finite and fixed stepping angles. Finally, reasonable transport accuracy using stepper motor drives can be achieved by greater coupling reduction relative to the requirements of a dc motor or equivalent motor drive reduction which further slows dependent transport speed.

Precision motion control to maintain the resolution of a paper transport mechanism employing a dc motor requires feedback from velocity and position sensors in conjunction with a shaft encoder 21 attached directly to the shaft of the motor. As the coupling reduction is decreased to afford greater transport speed, the resolution of the velocity and position feedback sensor(s) must proportionately increase to achieve a desired level of transport accuracy. As shall become apparent, the present invention provides means for direct feedback of velocity and position data which may be used for the selective decoupling or elimination of a shaft encoder in a precision printer or electronic imaging system.

Referring to FIG. 3, direct paper position feedback is obtained according to the invention through the use of position sensor 20. The sensor is disposed along the running edge of paper 1 to continuously read the relative position and motion of a sprocket hole, leading and/or trailing paper edge, which shall be referred to generally as a demarcation or series of demarcations along the running length of the paper. In the as-shown embodiment, paper position sensing is achieved through photoemitter and photodetector elements contained in paper position sensor 20. Photoemitter 31 and photodetector 33 are positioned such that there is an optical path therebetween that is intersected by the paper 1 (or 4), and such that the paper sprocket holes 2, leading or trailing edges 5, 6, respectively, or other optically distinguishable paper demarcation will pass through said optical path as the paper is advanced by the sprocket or alternative transport mechanism. Electromagnetic energy from photoemitter 31 illuminates the paper and demarcation(s). The intensity of the photobeam and signal captured by the photodetector element 33 are affected by the presence or absence of said demarcation and/or paper acting to reflect, absorb or attenuate the photobeam according to the nature of said disposed demarcation and photoemitter source 31.

The signal generated by the photodetector element 33 in response to said demarcations may be used to establish the presence and position of the paper for registration of the print head, pen, or scanner in conjunction with the shuttle head 12 and drive motor 27. Said photoemitter 31 and photodetector 33 pair have an effective response or window length (area coverage), measured in the direction of the paper drive, such as to sufficiently monitor the continuous movement of the paper. Electrical leads (not shown) extending from the photoemitter 31 and photodetector 33 connect to control circuitry which is described in more detail below. Also later described are the details of a state-of-the-art photoemitter and photodetector pair which may be used for sensing sprocket holes, paper edges or other demarcations along the running length of the paper, and for generating a suitable control or error signal for use by the control circuitry according to this invention to accurately register the individual print, scan line, or bands thereof.

This invention may be used for a wide variety of inking (or otherwise marking), printing and imaging applications which require precision registration means for electronic imaging, electronic printing (mixed text and graphics printing), and diagnostics image data transfer. In conjunction with conventional printer devices, said means would include but are not limited to ink pens, wire matrix impact print heads, hammer print heads, thermal print heads, thermal transfer print heads, ink jet print heads, and photoimaging devices (scanners). Many of these, image sensors for scanners in particular, are commercially available in page width array format allowing a full page width line or band of lines to be printed or scanned simultaneously. Referring to FIG. 3, most of these devices may be embodied in the shuttle head 12 as shown in the figure. In operation, the shuttle head may be made to print or scan a line or band of lines by traversing back and forth across the paper in a direction which is again orthogonal to the machine or paper drive direction of the transport. Shuttle head 12 is typically designed to slide along a stationary guide rod or way 13 to maintain transverse positional alignment with respect to the paper. Conventionally, the shuttle head 12 is accurately translated by a second motor 27 via a taut continuous wire loop or belt 24 attached to the shuttle head and looped about an idler pulley 25 and drive pulley 26 (attached to the motor) on opposite ends of its traverse travel path. Feedback for the shuttle head positioning and control is normally obtained from an incremental shaft encoder 28 attached to the motor drive shaft. The motion of the two drive motors 17 and 27 are orchestrated through a central motion control circuit which provides proper synchronization of the shuttle head and paper.

FIG. 4 shows preferred embodiments A, B of the system employing the photoemitter and photodetector means illustrated in FIG. 3. The photoemitter 31 is comprised of a suitable lamp, series of lamps, or according to the preferred embodiment, a linear array of thin film solid state lamp elements which emit suitable wavelength(s) and intensity for the dependent demarcation of detection scheme. A compensating lens 32 (optional) is disposed between the photoemitter and the paper for uniformly dispersing or shaping the photobeam to achieve the desired illumination coverage for detecting said demarcations and/or paper. Photodetector 33 is comprised of a single elongated, directionally sensitive photosensor such as a Schottky barrier photodiode, or a plurality of photosensitive elements disposed in a closely adjacent relationship and longitudinally arranged with respect to the transport direction of the paper. Preferably, the length of the elongated photosensor or plurality of photosensors is approximate to the centerline spacing between adjacent sprocket holes. Electrical connections (not shown) are used to carry any signals that may be generated by the photosensors to the positioning control circuitry. The photosensors are positioned so that the optical path between the photoemitter and photosensor will intersect the path of travel of the paper sprocket holes 2 as illustrated in the figure. The effective wavelength of the energy emitted by the photoemitter 31 is chosen such that specific spectral components in the illuminating beam are not substantially transmitted by the paper except through the sprocket holes. In transports designed to handle optically translucent media, including conventional paper, suitable sources would normally be restricted to those which emit photons in the infrared to visible light region of the electromagnetic spectrum when utilizing solid state photoemitters and diodes.

The operation of the photoemission and detection means shown in FIG. 4 will vary depending on the type of photodetector employed. The sensor array 33 must be long enough to cover at least one of the edges of both holes (trailing or leading) in any adjacent pair of demarcations used for positioning and for end-to-end coverage of any single demarcation or hole. In addition, the sensor array must be sufficient to cover or otherwise record the distance from the edge of the paper to the leading edge of the first demarcation when the paper is inserted into the mechanism as well as the last edge of the last demarcation to the edge of the paper when the paper is leaving the mechanism. It is obvious that a large sensor array will enhance the accuracy of position sensing and may in some instances (e.g., in the case of single sheet feed) run the entire length of the paper. Further, it is assumed in the teachings of the invention that demarcations may not be applied in such a fashion as to coincide with the edge of the paper, thus requiring an additional sensor to indicate that the paper has entered the mechanism.

A flow chart illustrating the sensing of demarcation edges (e.g., sprocket holes) to be used for paper and/or printer head positioning is shown in FIG. 5. When the paper enters the mechanism, it is treated as an edge of a demarcation 40 for the purpose of positioning and also as a single to activate the advance mechanism. As the paper moves beneath or past the sensor array, the sensor looks for an edge 40 indicating the beginning of a demarcation which establishes a new reference signal 41. The process continues until another edge, this time the trailing edge of the demarcation arrives and the reference is set for that edge 41. This process continues until one edge is the end of the paper. The mechanism may not know that the paper is leaving and may continue to advance paper 42. When the total advance equals the length of the detection array and no new edge is detected 43, the process is stopped 45.

Figure 6:
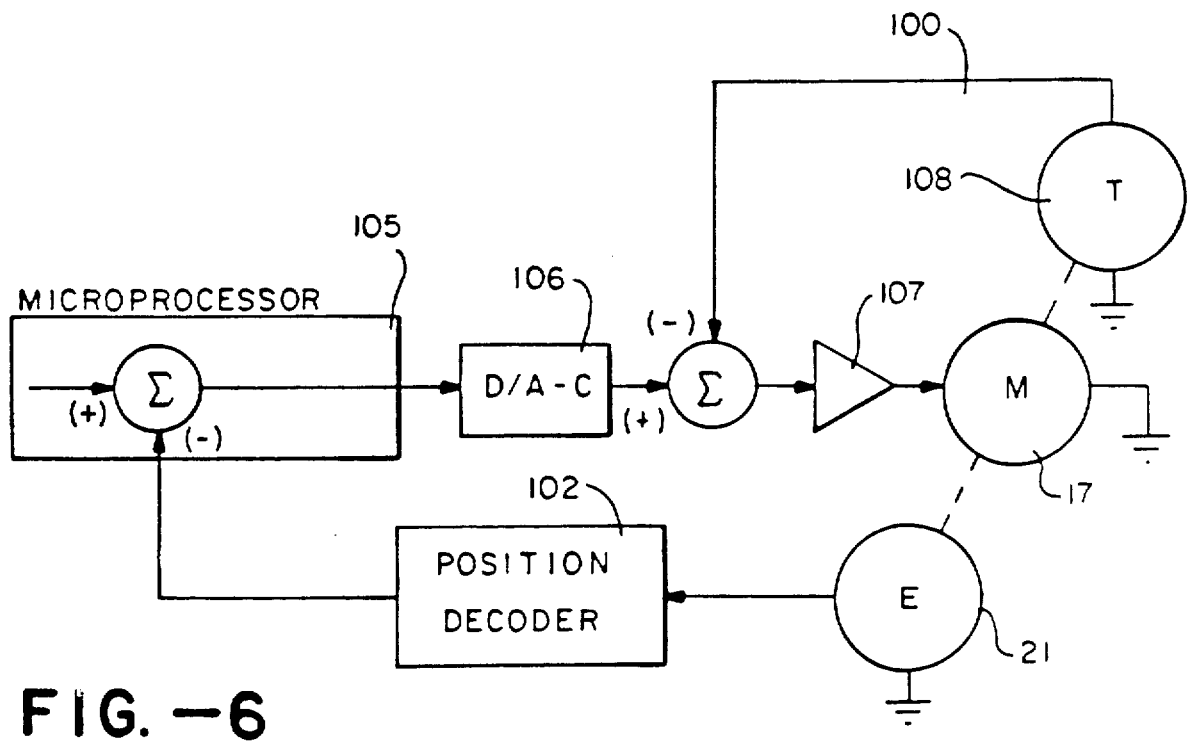
FIG. 6 is a block diagram of a position control system usable in implementing the features of this invention.

The basic elements of a position control system according to the teachings of this invention are shown in FIG. 6. The paper advance mechanism employs a velocity feedback loop 100 via tachometer 108 to provide control at low speeds. It also contains a digital feedback loop for position control of the print head or scan head in conjunction with an encoder 21 and suitable microprocessor 105. The algorithm of the microprocessor contains a digital filter to avoid oscillation in the closed loop system. This is accomplished through software which allows the system to accommodate critical dampening for operation at optimum performance levels of the motor. Many suitable servo controllers are available in various configurations ranging from integrated circuit (IC) components to printed circuit board solutions representing a complete system.

An alternative embodiment of the paper positioning sensor 20 may be used to monitor the position of the leading edge 5 or trailing edge 6 of paper sheet stock 4 that does not contain sprocket holes. For use in a friction drive printer or scanner device, photoemitter 31, lens 32 and photodetector 33 must be adapted in length to be nominally the length of the paper in the machine direction of the transport mechanism. For most applications, the required lengths of these components will be in the order of 3 to 14 inches. Such lengths are compatible with material forms which may be produced in conjunction with conventional semiconductor process steps; for example, the use of large scale amorphous silicon photosensor arrays with thin film deposited polycrystalline silicon switching transistors or hybridization involving two or more types of photosensor arrays mounted end to end. Photoemitter and photodetector devices of such scale are now offered as commercially standard imaging products. Schottky barrier photosensors in long lengths are also commercially available which can be implemented as described.

A further embodiment of the novel paper position sensor 20 is shown in FIG. 4B. Photoemitter 31 (not shown) and photodetector 33, having essentially identical composition and function as previously described for a conventional feedback device, are located on the same side of paper 4 or 1. Electromagnetic energy from the photoemitter is directed to strike the surface of the paper where it is at least partially reflected towards the photodetector. Preprinted or otherwise disposed demarcations 35 contained on said paper at the point of the incident radiation beam are compared to substantially absorb the impinging beam, and thereby prohibit or reduce the reflection or transmission of energy to the photodetector. A suitable lens 36 is employed to direct said reflected or otherwise transmitted light to photodetector 33, so as to create a signal corresponding to the signature image of the sensed demarcation or transition edge. When properly spaced, the demarcations provide an optical reference which moves in relation to the paper for position reference and circuit trigger control. Resulting signals may be processed as previously discussed for precision feedback advance using the control circuit for the transmission type sensor arrays illustrated in FIG. 4A.

There are several advantages to be gained by using the reflecting type position sensor illustrated in FIG. 4B. First, by preprinting the demarcations 35 at regular intervals and at spatial separations which are less than the separation between conventional sprocket holes, typically 0.50", the length of photoemitter 31 and photodetector 33 can be greatly shortened. This not only lowers dependent devices cost, but also in the case of photodiode array sensors provides for greater control bandwidth since the number of photoelements accessed per photosensor length is shortened. Second, the reflection type sensor can be configured to read both passing edges and scribed (inked) demarcations. This is accomplished by simply providing a non-reflecting surface or space beneath the paper at the point where the paper position sensor is focused such that an edge will be optically represented as a transition between the paper and said non-reflecting surface or space.

In each of the above position feedback schemes, the paper position feedback sensor 20 provides continuous data feedback to the control circuit to an accuracy which is not dependent on the integrity of the coupling between motor 17 and paper 1. Accordingly, the time derivative of the feedback signal can be used to obtain velocity information which may be used to eliminate the need for a shaft encoder in an alternative embodiment employing a dc motor drive. Selection of the preferred embodiment is dependent on the nature of printing, e.g., printing which may require switching between half-tones and text, where speed and accuracy may be aided by a selective advance which may incorporate two or more positioning mechanisms.

Finally, triggering may be employed for forced demarcation reference following a line scan where no printed dots or characters for position reference are found by the employed sensor means. In this case, a suitable demarcation would be applied in proximity to a running edge of the paper following each empty scan line or index (advance) of the unprinted paper. In a first embodiment, the demarcation means is most simply an inking device located at a fixed position in proximity to the margin of the paper. Said inking means marks the paper in synchronous with its forward advance according to a preselected spacing that is compatible with the effective sensing length of the paper position sensor. The print head means in a conventional printer device may be extended to provide for such demarcation reference. For example, referring again to FIG. 3, print head 12 can be returned to the paper margin proximate to paper position sensor 20 preceding or following the scan or inking of a given print line or pass. The print head so positioned may be located over the removable sprocket hole strip such that a thin printed line or other demarcation reference may be deposited on the paper in a preferred orientation, e.g., orthogonally to the direction of the paper advance. With successive scan lines or bands swaths of print 3, a continuous series of equally spaced demarcations 41 can be applied. Said demarcations entering the sensing region of paper position sensor 20 are then used to monitor the exact movement of the paper. The demarcation method thus described is particularly suited for use with friction feed drives wherein the benefits include a reduction in the complexity and cost of the position sensor device. However, since the sheet stock which is most typically used with friction drive printers does not incorporate a removable margin strip, demarcations 41 must be applied to the running edge of what will normally become the finished printed product. Assuming that no secondary transfer medium for copy or strippable reference margin will be employed, the demarcation ink used in conjunction with single sheet stock would normally be formulated such that it is not readily detected by the human eye, e.g., comprised of a substance which substantially absorbs or reflects light in the near infrared spectrum while being transparent to light in the visible spectrum. This limitation necessitates that a separate portion of the print head be dedicated to the demarcation process. A suitable demarcation means may include but is not limited to the use of an additional stripe of the inking ribbon to apply the non-visible ink.

The preferred embodiment for use in conjunction with single sheet friction drives is shown in FIG. 9. Paper position sensor 20 is attached to the traversing carriage of print head 12 such that part of each succeeding line or band of print 3 is used as a position feedback demarcation. Photodetector 50 comprised of an elongated directionally sensitive photosensor device, such as a Schottky barrier photodiode or, preferably, a plurality of photosensitive elements disposed in a housing such as to maintain a closely spaced adjacent relationship between the individual elements in an array configuration device, is longitudinally arranged with respect to the transport direction of paper 4 and made to traverse with print head 12 by attachment to its carriage mechanism. Print head 12 is translated back and forth along a guide path which is orthogonal to the plane of view. Guide rod 13 is used to properly align and space the print head with respect to paper 4. Following or in conjunction with the printing of any print line or band of lines 3A by print head 12, the image of the print or suitable portion of print 3A is projected onto photosensor 50 via lens 56 disposed between the paper 4 and photosensor 50. The surface of paper 4 is illuminated proximate to said image area by a lamp or series of lamp elements (not shown) preferably disposed on the print head carriage adjacent photosensor 50. An edge 60 demarcating the beginning of the reference print on line or swath 3A is projected to position 57 on photosensor 50 to create a position response signal. Said signal is used to establish a reference for advancing the paper before beginning the next line of print or scan index. Sensor 50 is preferably motionless during the sensing operation. Friction wheel 52 is servoed by the control circuitry to move paper 4 along the print drive direction 59. As the print line or band 3 is moved from its initial position 3A through the desired stepping increment to position 3B, the leading edge 60 of the demarcation (now at position 61) will be projected to a second position 58 on photosensor 50. During the step advance of the paper, the movement of edge 60 projected onto photosensor 50 causes a corresponding electrical signal to be generated for position feedback to the paper transport drive servo. The resolution of the paper position sensor may be adjusted electrically by varying the threshold level (amplifier gain) required for triggering, or optically by projecting the image via lens 56 onto an appropriately sized sensor element. By selecting the paper stepping distance to be exactly the width of each print line or swath 3, the above paper position feedback scheme provides means for positioning successive printings within an accuracy of a few micrometers.

In the case of embodiments which utilize the traversing paper position sensor as shown in FIG. 9, a repeatable location along each traverse scan for sensing the demarcations is not normally reliable since the printing along each line or swath 3 will normally vary from line to line or swath to swath. This problem is overcome by sensing and recording the exact location of suitable demarcations during each printing traverse or scan of print head 12.

Figure 7:
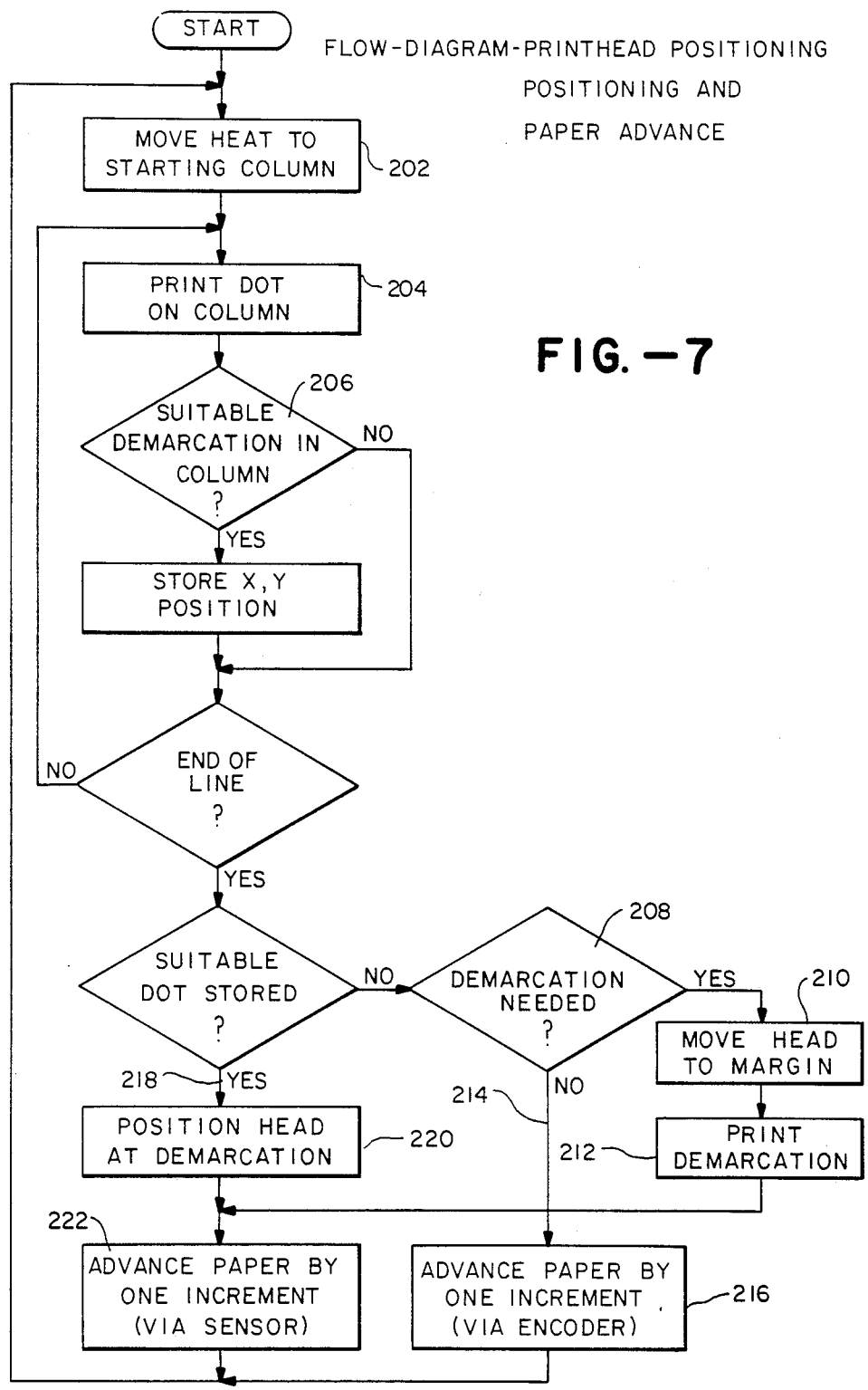
FIG. 7 is a flow chart of the steps used in repeatably positioning the print head relative to selected lines of printing.
Figure 3:
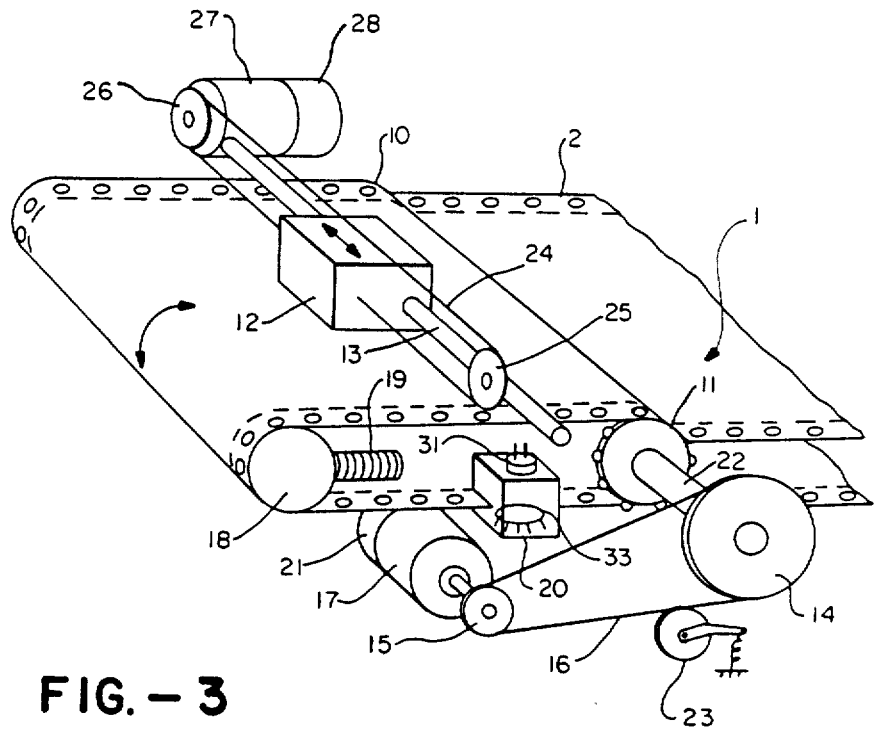

The basic steps of print positioning and paper advance appear in FIG. 7. Upon completing each print line or swath by moving the print head to the column 202 and printing a dot or character in that column position 204, the print head and paper position sensor can be returned to a recorded position along the traverse scan corresponding to a suitable demarcation from which the paper can be servoed 206. In the event no demarcation is sensed 208, indicating that printing did not occur in the plane of the scan line, a forced demarcation via print head 12 or suitably disposed margin inking device 210 may be used to establish a demarcation reference for position feedback as previously discussed 212. Where no demarcation is needed 214 paper positioning may be obtained by conventional means employing a shaft encoder 216. This is normally an acceptable fallback condition since banding due to paper positioning error only occurs between successive print lines or swaths of lines 3. Where a suitable printed dot to serve as a demarcation has been stored 218, the head can be positioned using this demarcation 220 and the paper then accurately advanced incrementally from this reference 222. Means for selective paper advance via a combination of both precision demarcation sensing and encoder control is within the intended teachings and options of embodiments which may be implemented through this invention.

Suitable electronics exist for detecting and balancing the leading and trailing edge signals from the demarcations used to initiate a uniform servo advance in accordance with the teachings of this invention. Referring to FIGS. 9 and 10, paper position detector 20 employs a linear array of sensor elements 50 which reduces the spurious effects of dust particles and possible variations in the parameters of the electrical circuit by detecting the center of the sensed position reference demarcation. In the preferred embodiment, a velocity feedback loop assumes good control at low speeds. During the advance of print head 12, a digital control loop senses the demarcations by means of sensor 20 and sends position information to the position decoder 102. A special sensitivity calibration may be used to assure that the output signals from the linear array detector are mainly digital in nature. A suitable signal level detector (e.g., Schmitt-trigger) 104 at the output assures that the signals are digitized and can be processed by the position decoder 102. The controller 105 is typically an 8-bit microprocessor employing a standard RAM memory package, e.g., 64k or 128k byte chip, for sensor position and velocity feedback. Signal feedback from the print head or scan head or paper position sensor, velocity feedback loop and encoder 21 (if employed) is used to activate and control the paper registration, print and paper advance functions in accordance with the teachings of this invention. Options (depending on required registration accuracy and printer/scanner application) include motor 27, encoder 28 and counter 103 to input column information to microprocessor 105 to initiate various print and drive advance functions in accordance with the described teachings. Finally, digital-to-analog converter 106 sends the required signal to the motor power amplifier 107. An IC circuit can be used to perform this function. An alternative method would be to generate a pulse-width-modulated (PWM) signal, which may be generated by the microprocessor. In this application, the PWM signal would be switched at a fixed frequency and varied according to the motor command.

The operation of the mechanical portion of the preferred embodiment of this invention proceeds as follows generally following the outline of FIG. 8: the paper transport is energized 302 to advance the tractor feed or sheet stock paper into the primary position for printing or scanning 304. During this initial sequence, the paper is advanced until the first sprocket hole, edge or demarcation is sensed by the paper position sensor 20 through the photoemitter and photodetector elements. The control circuitry recognizes the resulting electrical signal from the sensor as a reference position indicator. The location of the first print or line scan with respect to the reference demarcation (signal) is drawn from electronic memory by the control circuitry 306. The paper transport advances 308 and registers the paper at the position of the first line scan or print location using standard closed loop motion control feedback, receiving the paper position feedback signal from the position sensor. Each successive sprocket hole, edge, or demarcation print that enters the active sensing region of the photosensor provides an electronic signal. This signal denotes the transition of the paper (demarcation reference) according to the measured degree or fraction of the demarcation signal previously recorded 310. Position feedback is then obtained by monitoring the movement of the demarcation, adding 312 or subtracting 314 signal value depending upon the direction of sensed paper movement. The paper transport can thus be made to precisely move in continuous, incremental and/or bidirectional sequences for relative positioning as directed by the printer or scan head. The closed loop feedback signal for paper positioning relative to an observed or forced demarcation (as opposed to the absolute positioning described in the prior art) allows multi-line or swath printing of characters wherein observed fringe banding may be substantially reduced or eliminated.

The foregoing description is offered primarily for purposes of illustration. It will become readily apparent to those skilled in the art that numerous variations and modifications of each of the system aspects described herein, as well as alternative components, structural fetures and modes of operation, can be introduced into the system without departing from the spirit and scope of the invention as defined by the appended claims. For example, independent advance and positioning of the print head may be utilized to maximize speed of operation.

What is claimed:

1. A paper transport system for advancing and accurately positioning a piece of paper having leading and trailing edges and right and left sides relative to a print head, said print head including means for printing a plurality of lines or swath of characters per single paper index, from the right side to the left side of said paper along lines orthogonal to the direction of advance of the paper, said transport system comprising drive means for intermittently advancing said paper relative to said print head, means for detecting one of a plurality of demarcations on said paper, each of said lines of characters having a known position relative to one of said demarcations, control means to regulate said drive means for positioning said paper relative to said lines or swath, and responsive to said demarcation detection means, whereby said paper and each line to be printed thereon is reliably and repeatably positioned relative to its previous or succeeding adjacent print line or swath.

2. A paper transport system as in claim 1 incorporating further alternative means for printing a single line of characters following each print line index of the paper or print head, whereby positioning of each successive print line is determined by the position of its most adjacent sensed print line or demarcation reference.

3. A paper transport system as in claim 1 wherein said drive means comprise a friction drive including a driving roller and a pinch roller pinching said paper to advance said paper relative to said print head.

4. A paper transport system as in claim 3 including a sensor array extending at least from said leading edge of said paper to a first of said demarcations, and from a last of said demarcations to said trailing edge of said paper, whereby the presence of said paper in registry with said printing means can be detected.

5. A paper transport system as in claim 4 wherein each of said demarcations includes at least one detectable edge, said demarcation detection means comprising edge means for detecting a leading edge of said paper and an edge of said demarcation, memory means responsive to said edge means for storing a signal representative of said edge, said control means being responsive to the signal stored in said memory for positioning said paper relative to said print head.

6. A paper transport system as in claim 1 wherein said means for detecting demarcations comprise a sensor array including a photoemitter focused on said demarcation and a photodetector responsive to emissions from said photoemitter as attenuated by said demarcation to indicate presence of one of said demarcations.

7. A paper transport system as in claim 6 including a series of demarcations along one edge of said paper, said means for detecting demarcations including a photoemitter of sufficient length to simultaneously illuminate two successive demarcations, and wherein said fine positioning means is responsive to the output of said means for detecting said demarcations to bidirectionally position said paper relative to said print head.

8. A paper transport system as in claim 7 wherein said photosensor is of sufficient length to overlie center-lines of said two successive demarcations.

9. A paper transport system as in claim 8 where said photoemitter includes means for emitting an illuminating beam of an effective wavelength detectable by said photosensor only in the presence of at least one of said demarcations.

10. A paper transport system as in claim 1 wherein said demarcations comprise a series of holes along at least one side of said paper, said drive means comprising sprocket carrying means engaging said holes for moving said paper along said given path of movement.

11. A paper transport system as in claim 1 including means responsive to said control means for causing said print head to print said lines of characters in a fixed spatial relationship relative to said leading and trailing edges of said paper.

12. A system as in claim 1 wherein said print means further comprise demarcation print means incorporated with said character print means for printing demarcations on said paper adjacent to said lines of characters, whereby said demarcations may be regularly imposed on said paper at a location determined by the sensed position of said lines of characters.

13. A system as in claim 12 wherein said demarcation print means are incorporated for translatable movement with said print head orthogonal to the direction of said paper advance, said print means being actuated for printing said orthogonal lines of characters within a defined character print region, said demarcation print means being actuated to print said demarcations in a region between a side of said paper and said defined print region, each of said demarcations comprising a thin line or otherwise suitable demarcation forms for recognition using said demarcation detection means.

14. A system in accordance with claim 13 including means to actuate said demarcation means in the event that a suitable demarcation for positioning said paper relative to said print head is not detected by said demarcation sensing means.

15. A system as in claim 1 wherein said means for detecting demarcations comprise a photoemitter and a photodetector mounted on a common side of said paper, emissions from said photoemitter being attenuated by said demarcations and detected by said photodetector to provide said position response signal for line positioning of said paper.

16. A system as in claim 15 wherein said photoemitter and photodetector are mounted for translational movement with said print head over said lines of characters, edges of said lines of characters serving as demarcations for detection by said demarcation detecting means.

17. A system as in claim 16 wherein said means for coarsely positioning said paper comprise means for advancing said paper in successive steps, each step being limited to the width of a line of characters as measured in the direction of paper advance.

18. A paper transport system as in claim 17 further including a support plate for said paper having a surface contrasting with said paper, whereby attenuation of the signal from said photoemitter is maximized.

19. In a paper transport system, a method for advancing and accurately positioning along a given path of movement a piece of paper having leading and trailing edges and right and left sides relative to a print head including means for printing lines of chracters from the right side to the left side of said paper orthogonal to the direction of movement of said paper, said method comprising the steps of advancing said paper relative to said print head,
detecting a demarcation in a known position on said paper, said demarcation being in a fixed position relative to one of said lines of characters,
developing a control signal representing an edge of said demarcation on said paper, coarsely positioning said paper line by line relative to said print head, again detecting said demarcation, and
responding to a position response signal from said demarcation detection steps to fine position said paper relative to said print head, whereby each character line on said paper is reliably and repeatably positioned relative to said print head.

20. A method as in claim 19 wherein each of said demarcations includes at least one detectable edge, said demarcation detection step comprising detecting a leading edge of said paper or an edge of said demarcation, storing a signal representative of said edge, and responding to the signal stored in said memory for positioning said paper relative to said print head.

21. A method as in claim 20 wherein said print means further comprise demarcation print means mounted adjacent said character print means, said method including the step of printing demarcations on said paper adjacent said lines of characters, whereby said demarcations may be regularly imposed on one of said sides of said paper.

22. A method as in claim 21 wherein said demarcation print means are mounted for translatable movement with said print head, said method including the step of actuating said printing means for printing said orthogonal lines of characters within a defined character print region, and actuating said demarcation print means to print said demarcations in a region between a side of said paper and said defined character print region, each of said demarcations comprising a thin line orthogonal to a direction of paper advance.

23. A method as in claim 19 wherein said step of detecting demarcations comprise mounting a photoemitter and a photodetector on a common side of said paper, causing emissions from said photoemitter directed at said demarcations to be reflected to said photodetector, said emissions being attenuated by said demarcations and detected by said photodetector to provide said position response signal for line positioning of said paper.

24. A method as in claim 23 including the step of mounting said photoemitter and photodetector for translational movement with said print head over said lines of characters and detecting edges of said characters printed by said character print means to serve as demarcations for said demarcation detecting step.

25. A method as in claim 24 wherein said step of coarsely positioning said paper comprises advancing said paper in successive steps, each step being limited to the width of a line of characters as measured in the direction of paper advance.

* * * * *

UNITED STATES PATENT AND TRADEMARK OFFICE
CERTIFICATE OF CORRECTION

PATENT NO. : 4,734,868

DATED : March 29, 1988

INVENTOR(S) : Thomas J. DeLacy

It is certified that error appears in the above—identified patent and that said Letters Patent is hereby corrected as shown below:

On the title page, ABSTRACT, line 5, alter "device provide for the proper" to --device provides for proper-- line 11:     alter "pring" to --print--

Line 20:     after "includes" insert --a--

The title page should be deleted to appear as per attached title page.

In the drawings, figures 3, 6 and 7 should be deleted to appear as per attached sheets.

Signed and Sealed this

Twenty-fourth Day of July, 1990

Attest:

HARRY F. MANBECK, JR.

Attesting Officer      Commissioner of Patents and Trademarks

United States Patent [19]

DeLacy

[11] Patent Number: 4,734,868
[45] Date of Patent: Mar. 29, 1988

[54] PRECISION PAPER TRANSPORT SYSTEM
[75] Inventor: Thomas J. DeLacy, Santa Clara County, Calif.
[73] Assignee: VFN Technology Inc., Cupertino, Calif.
[21] Appl. No.: 887,660
[22] Filed: Jul. 21, 1986
[51] Int. Cl.⁴ .............................................. G05B 11/01
[52] U.S. Cl. ................................ 364/519; 355/14 R; 364/518
[58] Field of Search .................... 364/518, 519, 521; 355/4, 14 R, 77; 101/151, 152, 248

[56] References Cited
U.S. PATENT DOCUMENTS

| | | | |
|---|---|---|---|
| 3,919,560 | 11/1975 | Nopper | 250/557 |
| 4,091,911 | 5/1978 | Chang et al. | 364/519 X |
| 4,485,982 | 12/1984 | St. John et al. | 242/57.1 |
| 4,569,584 | 2/1986 | St. John et al. | 355/14 R |
| 4,591,969 | 5/1986 | Bloom et al. | 364/519 X |

Primary Examiner—Gary V. Harkcom
Assistant Examiner—H. R. Herndon
Attorney, Agent, or Firm—Flehr, Hohbach, Test, Albritton, and Herbert

[57] ABSTRACT

A novel closed loop direct position feedback control method and recording apparatus for producing on a recording medium a plurality of successive print lines or otherwise component images. An appendant demarcation device provide for the proper abutting and spacing of each independent print character to prevent or minimize any perceived "banding" in the printed image. The apparatus includes a device for transporting the medium along a path orthogonal to the print head, a recording station in the path and having a translating head for inking, pring, or otherwise suitable device, for producing single lines or swaths of print in conjunction with the indexed advance of the medium relative to the print head. The transport device is operative to advance a first print line or swath through the recording station to form a first print line, to identify and store the position coordinates of each print line or swath, and to advance the recording medium for successive line or swath printing. The direct position feedback control apparatus also includes demarcation sensing and printing device for relative positioning, whereby the distance between the location of any sensed or printed demarcation reference and the next successive print line is controlled such that each print line will neglect the positioning error in any previous print line or swath.

25 Claims, 11 Drawing Figures

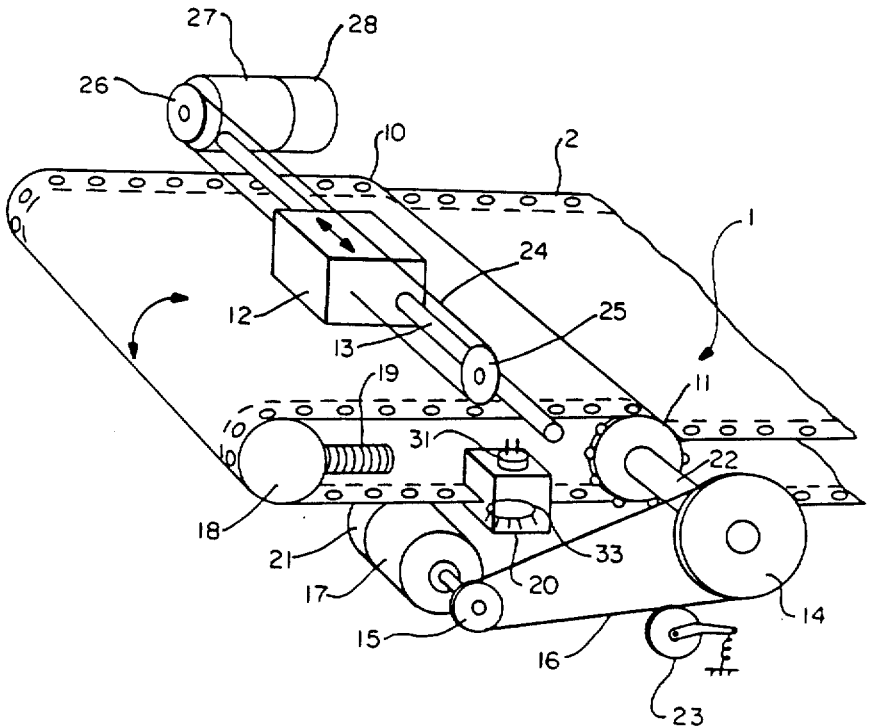

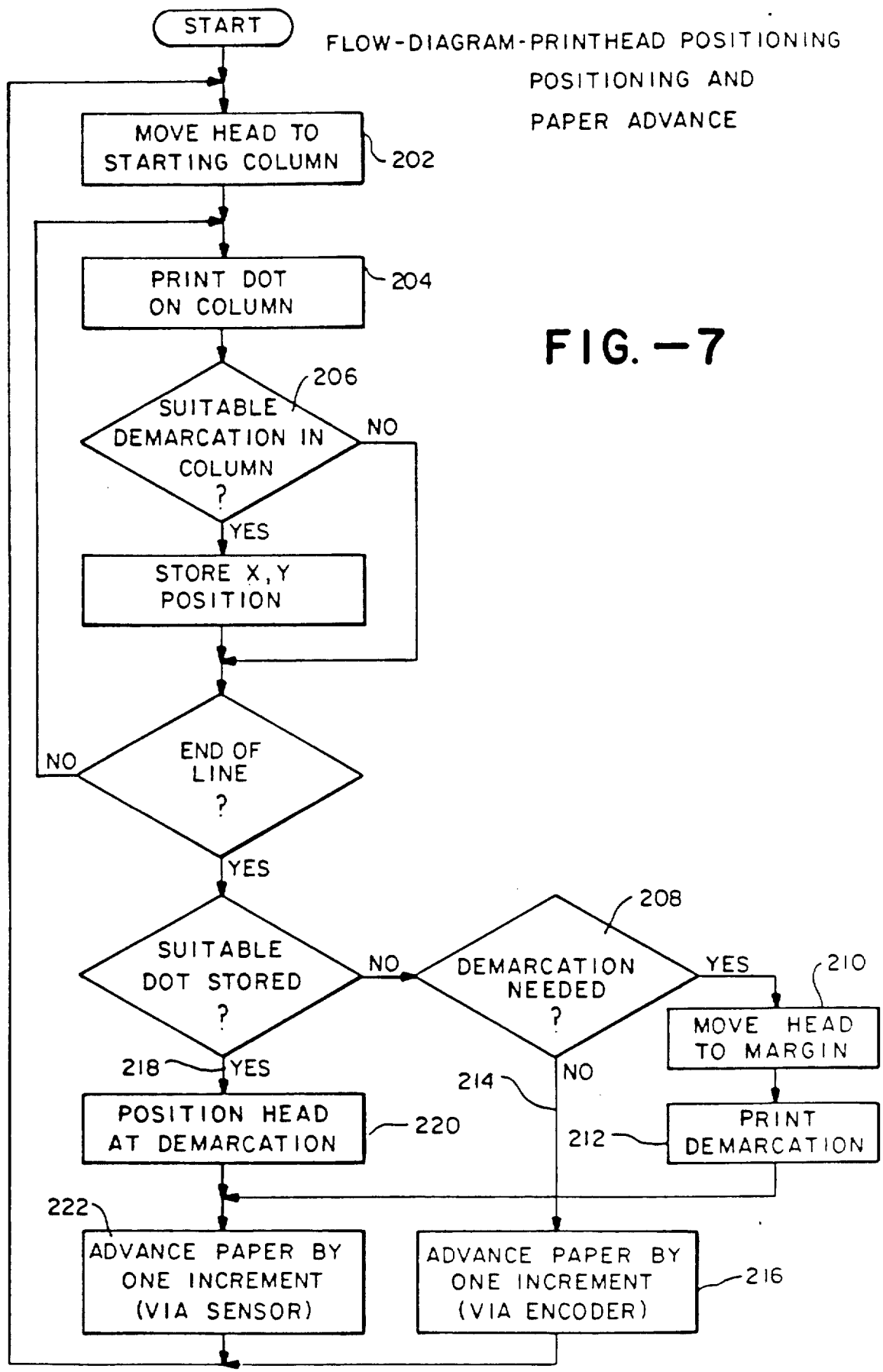
FIG. —7